Sept. 29, 1925.
J. A. GORTON
VALVE PACKING DEVICE
Filed Sept. 13, 1924
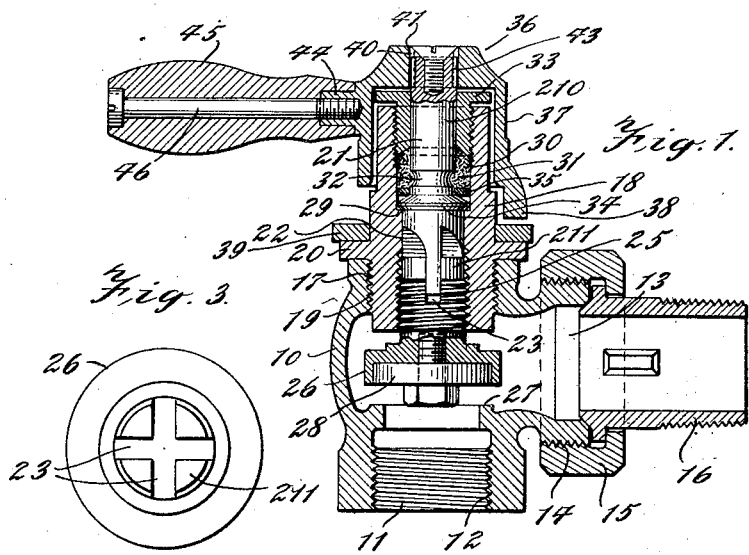
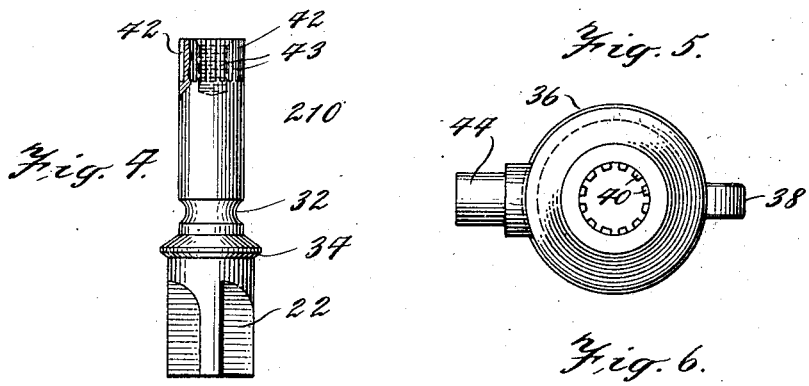
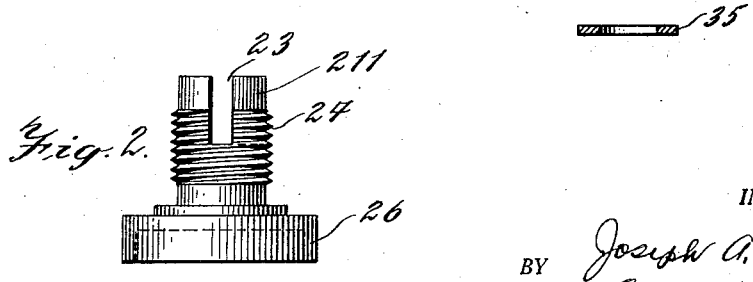
INVENTOR.
BY Joseph A. Gorton
His ATTORNEYS Patented Sept. 29, 1925.

1,555,412

UNITED STATES PATENT OFFICE.

JOSEPH A. GORTON, OF MONTCLAIR, NEW JERSEY, ASSIGNOR TO GORTON & LIDGERWOOD COMPANY, OF NEW YORK, N. Y., A CORPORATION OF NEW YORK.

VALVE-PACKING DEVICE.

Application filed September 13, 1924. Serial No. 737,501.

*To all whom it may concern:*

Be it known that I, JOSEPH A. GORTON, a citizen of the United States, residing at Montclair, in the county of Essex and State of New Jersey, have invented certain new and useful Improvements in Valve-Packing Devices, of which the following is a specification.

One of the objects of my invention is the provision of a packing for valves in which the packing is locked in position while permitting rotation of the valve spindle with relative ease.

Other objects of my invention will appear in the specification and will be more particularly pointed out in the claims.

My invention will best be understood by reference to the accompanying drawings, in which Fig. 1 is a vertical section of a valve embodying my invention; Fig. 2 is a side view of the valve member; Fig. 3 is a plan view thereof; Fig. 4 is a side view partly in section of the upper portion of the valve operating stem; Fig. 5 is a plan view of the operating handle; and Fig. 6 is a sectional view through a washer.

Like reference characters indicate like parts throughout the drawings.

Referring now to the drawings, which illustrate one embodiment of my invention, 10 is a valve body in the form of a T provided with an inlet opening at 11 which is preferably screw-threaded, as at 12, to receive the steam supply pipe and is also provided with an outlet opening 13, the walls surrounding which are screw-threaded as at 14 to receive a coupling nut 15 for connecting thereto a coupling pipe 16, which may be connected to a radiator. The upper end of the T is provided with an opening at 17 in which is received a hollow hub or member 18 screw-threaded on its outer portion, as at 19, to engage the screw threads on the upper portion of the T of the valve head and preferably provided with an outwardly extending flange 20 which engages the upper edge of the T 10 when assembled in position. The valve operating stem 21 passes through the hollow hub 18 and in the form illustrated is formed in two sections, an upper section 210 and a lower section 211, which are fitted together so as to permit relative longitudinal movement between the two parts, but so that they rotate as a unit. In the form illustrated, the lower end of the portion 210 of the spindle is fluted as at 22, the fluted portions being received in slots 23 formed in the upper end of the lower portion 211 of the valve stem. The lower part 211 of the valve stem is preferably screw-threaded, as at 24, the screw threads thereof engaging screw threads 25 on the interior of the lower portion of the hub 18. The lower end of the portion 211 of the valve stem is provided with a valve 26 which engages in its lower position the valve seat 27 of the valve casing, the valve preferably being provided with a suitable disc 28 of fibrous material to engage the valve seat.

The upper portion of the hub 18 is provided with a shoulder, as at 29, above which the hub is separated from the spindle 21 to form an annular space 30 in which packing material 31 is received, the valve stem preferably being provided with an annular groove 32 in which the packing material is received and which serves to lock the packing in position when the same is forced home by a packing box nut 33, the screw-threaded portion of which engages the screw threads on the upper interior portion of the hub 18. The valve stem 21 is also preferably provided with a flange 34 which is preferably beveled both on its upper and its lower sides, the lower side of which engages the shoulder 29 of the hub, and on the upper portion of which is received a washer 35 preferably located immediately below the annular groove 32 of the valve stem, the washer substantially spanning the space between the valve stem and the hub to form a seat for the packing material.

An operating handle 36 is secured to the upper end of the valve stem 21, and preferably comprises a bonnet 37 which encloses the upper portion of the hub and associated parts, and is preferably provided with an indicating finger or member 38 located immediately above a dial member 39 in the form of a washer resting on the flange 20 of the hub. The operating handle 36 is secured to the upper end of the valve stem 21 and in the form illustrated is provided with ribs 40 formed on the inner wall surrounding an opening 41 which engage between the recesses 42 formed between ribs 43 on the upper end of the valve stem 210 the ribs serving to lock the handle adjustably to the spindle. The operating handle 36 is preferably provided with a lug 44 to which the handle 45 may be attached as by a bolt 46.

Packless valves have heretofore been proposed, but are generally unsatisfactory, because of the necessary complications which they involve. In accordance with my invention a packing lock is provided which maintains the packing in position and at the same time permits free rotary movement of the valve stem. The valve stem is operated by the handle 45, the rotation thereof with corresponding rotation of the valve stem causing the lower portion 211 of the valve stem through its screw-threaded engagement with the hub to be raised or lowered as desired. The provision of the annular groove 32 in the valve stem 210 causes the packing material to be locked permanently in position; at the same time the provision of the double faced flange 34 on the valve stem and the upper side of which engages the ring or washer 35, and the lower side of which is seated against the shoulder 29 on the hub, provides a double knife-edge bearing between the valve stem and the hub on the one hand and the stem and packing on the other hand, so that the stem is permitted free movement and avoids the wedging action which takes place when the packing material engages directly on its lower side the operating stem and causes a binding action.

It will of course be understood that various modifications in the device illustrated may be made without departing from the spirit of my invention and without exceeding the scope of the claims.

I claim:

1. A valve device comprising a rotary valve stem provided with a flange beveled on its upper side, a member provided with an opening in which said stem is received and having a portion separated from said stem to form a space in which packing material is adapted to be received, and an annular member interposed between said flange and the packing space and forming a bearing with the beveled portion of said flange.

2. A valve device comprising a rotary valve stem provided with a flange beveled on both its upper and lower sides, a member provided with an opening in which said stem is received, the casing wall surrounding said opening being shouldered and forming a space between the casing and stem in which packing material is adapted to be received, and an annular member interposed between said flange and the packing space, said flange forming bearings above and below with said annular member and the shoulder of said casing, respectively.

3. A valve device comprising a rotary valve stem provided with an annular recess and a bevelled flange located below the same, a member provided with an opening in which said stem is received and having a portion spaced from said stem and surrounding said recess for the reception of packing material and a ring seated against and forming a bearing with the bevelled portion of said flange.

4. A valve device comprising a rotary valve stem provided with an annular recess and a bevelled flange located below the same, a member provided with an opening in which said stem is received and having a portion spaced from said stem and surrounding said recess for the reception of packing material, a ring seated against and forming a bearing with the bevelled portion of said flange, and a packing nut for compressing packing material into the space between said stem and said member and into said annular recess.

JOSEPH A. GORTON.